United States Patent
Zafar et al.

(10) Patent No.: US 10,713,029 B2
(45) Date of Patent: Jul. 14, 2020

(54) MANIFEST-ENABLED ANALYTICS PLATFORM DEPLOYMENT ENGINE

(71) Applicant: Accenture Global Solutions Limited, Dublin (IE)

(72) Inventors: Abdul Zafar, Plano, TX (US); Hossam E. Elsherif, West Windsor, NJ (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/176,273

(22) Filed: Oct. 31, 2018

(65) Prior Publication Data

US 2019/0129702 A1 May 2, 2019

Related U.S. Application Data

(60) Provisional application No. 62/579,514, filed on Oct. 31, 2017.

(51) Int. Cl.
- *G06F 8/61* (2018.01)
- *H04L 29/08* (2006.01)
- *G06F 8/71* (2018.01)

(52) U.S. Cl.
CPC ............ *G06F 8/61* (2013.01); *G06F 8/71* (2013.01); *H04L 67/34* (2013.01)

(58) Field of Classification Search
CPC ........................................................ G06F 8/61
USPC ........................................................ 717/177
See application file for complete search history.

(56) References Cited

U.S. PATENT DOCUMENTS

| | | | |
|---|---|---|---|
| 9,038,059 B2* | 5/2015 | Ellis | G06F 8/61 717/174 |
| 2003/0078959 A1* | 4/2003 | Yeung | G06F 8/62 709/201 |
| 2003/0212990 A1* | 11/2003 | Brodkorb | G06F 8/61 717/174 |
| 2004/0143830 A1* | 7/2004 | Gupton | G06F 8/61 717/174 |
| 2009/0276769 A1* | 11/2009 | Brannen, Jr. | G06F 8/61 717/174 |
| 2012/0036552 A1* | 2/2012 | Dare | H04L 41/0253 726/1 |

(Continued)

OTHER PUBLICATIONS

"[Jelastic] Cloud Scripting Overview"; cloudscripting.com website [full url in ref.] as captured by the Wayback Machine Internet Archive (archive.org) on Oct. 26, 2017 (Year: 2017).*

(Continued)

*Primary Examiner* — Wei Y Zhen
*Assistant Examiner* — Clint Thatcher
(74) *Attorney, Agent, or Firm* — Fish & Richardson P.C.

(57) ABSTRACT

Methods, systems, and apparatus, including computer programs encoded on a computer storage medium, for provisioning an analytics platform. The methods, systems, and apparatus include actions of obtaining a manifest for a platform to be deployed where the manifest specifies machines and tools to deploy on the machines, determining an order to deploy the tools on the machines based on the manifest, selecting, based on the manifest file, tool deployers that are configured to deploy particular tools on machines from among multiple tool deployers, and deploying the tools on the machines with the tool deployers that are selected and in accordance with the order that is determined.

18 Claims, 6 Drawing Sheets

(56) References Cited

U.S. PATENT DOCUMENTS

| | | | | |
|---|---|---|---|---|
| 2013/0031542 | A1* | 1/2013 | Arcilla | G06F 8/60 |
| | | | | 717/177 |
| 2013/0275623 | A1* | 10/2013 | Stoilov | G06F 8/61 |
| | | | | 709/246 |
| 2014/0359558 | A1* | 12/2014 | Chamberlain | G06F 8/34 |
| | | | | 717/105 |
| 2015/0149634 | A1* | 5/2015 | Nassaur | G06F 9/5072 |
| | | | | 709/226 |
| 2017/0206217 | A1* | 7/2017 | Deshpande | G06Q 30/0283 |

OTHER PUBLICATIONS

Yigal Edery; "Let's Build a Cloud . . . With PowerShell!—Parts 1&2"; Microsoft Technet blog website [full url in ref.]; May 2, 2012 (Year: 2012).*

"Application Dependencies in [Microsoft] SCCM 2012"; tjindarr wordpress blog page [full url in ref.]; May 4, 2012 (Year: 2012).*

* cited by examiner

MANIFEST-ENABLED ANALYTICS PLATFORM DEPLOYMENT ENGINE

TECHNICAL FIELD

This disclosure generally relates to provisioning an analytics platform.

BACKGROUND

Provisioning an analytics platform may require administrators manually deploy and configure various software tools. For example, a platform may enable the interoperation of three software tools that must each be separately deployed and configured so that they work with each other. The deployment and configuration of various software tools may be time difficult and time-consuming, and may also cause a lot of human errors that may require quality assurance activities.

SUMMARY

In general, an aspect of the subject matter described in this specification may involve a process for provisioning an analytics platform using a manifest-enabled deployment engine. Datacenter operations management teams have had a hard time improving the speed and ease with which new services and resources are made available to users. While public cloud services have appeared to offer fast and easy access to computational resources, many internal information technology teams have struggled to keep up with the rate and pace of system provisioning, repeatability, quality, change management, and configuration control activities that have been required by today's virtualized datacenter and cloud computing environments.

These teams have increasingly realized how difficult it is to deploy, manage, configure, and reclaim virtualized resources and cloud services using processes and management tools that were designed for much more static environments where applications, middleware, and systems were tightly coupled and changed slowly. For example, it can take upwards of one hundred fifty quality checks to deploy an environment on the cloud, and an inherent lack of end to end integration may add to the delays and cause a business to miss opportunities.

Many provisioning tools have limited scope and building secure environments with speed and maintain quality may require multiple teams due to disjointed systems to manage credentials, perform scans, patch, configure backups, and operate. System silos may create bottlenecks due to the lack of standards across vendors and may require exhaustive human interaction due to the closed nature of the systems. Moreover, public and private clouds may lack infrastructure that respond nimbly and on-demand with responsiveness and efficiencies as long as the end users/customers have ample time and resources to execute complex deployments with repeatable quality.

A system of provisioning an analytics platform using a manifest-enabled deployment engine may address some of the above issues. Such a system may provide a comprehensive framework to build standards based on a manifest, also referred to herein as a manifest file, for full environment awareness, automation flexibility, microservices, application protocol interface (API) management, and a security-based architecture. An advantage the system may provide is the deployment of platforms quickly in a standardized way simply by making a single API call that includes a manifest file as a parameter of the API call.

One innovative aspect of the subject matter described in this specification is embodied in a method that includes the actions of obtaining a manifest for a platform to be deployed where the manifest specifies machines and tools to deploy on the machines, determining an order to deploy the tools on the machines based on the manifest, selecting, based on the manifest file, tool deployers that are configured to deploy particular tools on machines from among multiple tool deployers, and deploying the tools on the machines with the tool deployers that are selected and in accordance with the order that is determined.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects determining an order to deploy the tools on the machines based on the manifest includes determining that a first tool obtains data from a second tool, and in response to determining that the first tool obtains data from the second tool, determining to deploy the second tool before deploying the first tool. In some implementations, determining an order to deploy the tools on the machines based on the manifest includes determining that a first tool is to obtain data from a second tool and a third tool is to obtain data from the first tool and in response to determining that the first tool is to obtain data from the second tool and the third tool is to obtain data from the first tool, determining to deploy the first tool and the second tool, configure the first tool to obtain data from the second tool, deploy the third tool, and configure the third tool to obtain data from the first tool.

In certain aspects, selecting, based on the manifest file, tool deployers that are configured to deploy particular tools on machines from among multiple tool deployers includes identifying a particular tool specified by the manifest and selecting a particular deployer for deploying the particular tool that is identified. In some implementations, selecting, based on the manifest file, tool deployers that are configured to deploy particular tools on machines from among multiple tool deployers includes selecting a particular tool deployer based on both (i) a particular tool specified by the manifest and (ii) a particular machine on which the particular tool is specified to be deployed. In some aspects, selecting, based on the manifest file, tool deployers that are configured to deploy particular tools on machines from among multiple tool deployers includes selecting a particular tool deployer based on both (i) a particular tool specified by the manifest and (ii) where in the order the particular tool is to be deployed.

In certain aspects, deploying the tools on the machines with the tool deployers that are selected and in accordance with the order that is determined includes deploying a first tool on an instance of a virtual server provided by a first cloud provider and deploying a second tool on an instance of a virtual server provided by a second cloud provider. In some implementations, a particular tool deployer for a particular tool of the tools comprises a script that is configured to receive an indication of a particular machine as an input and, in response to receipt of the indication of the particular machine, deploy the particular tool on the particular machine. In some aspects, actions include configuring the tools to interoperate in accordance with the manifest. In certain aspects, actions include validating the platform after the tools are deployed.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1A:
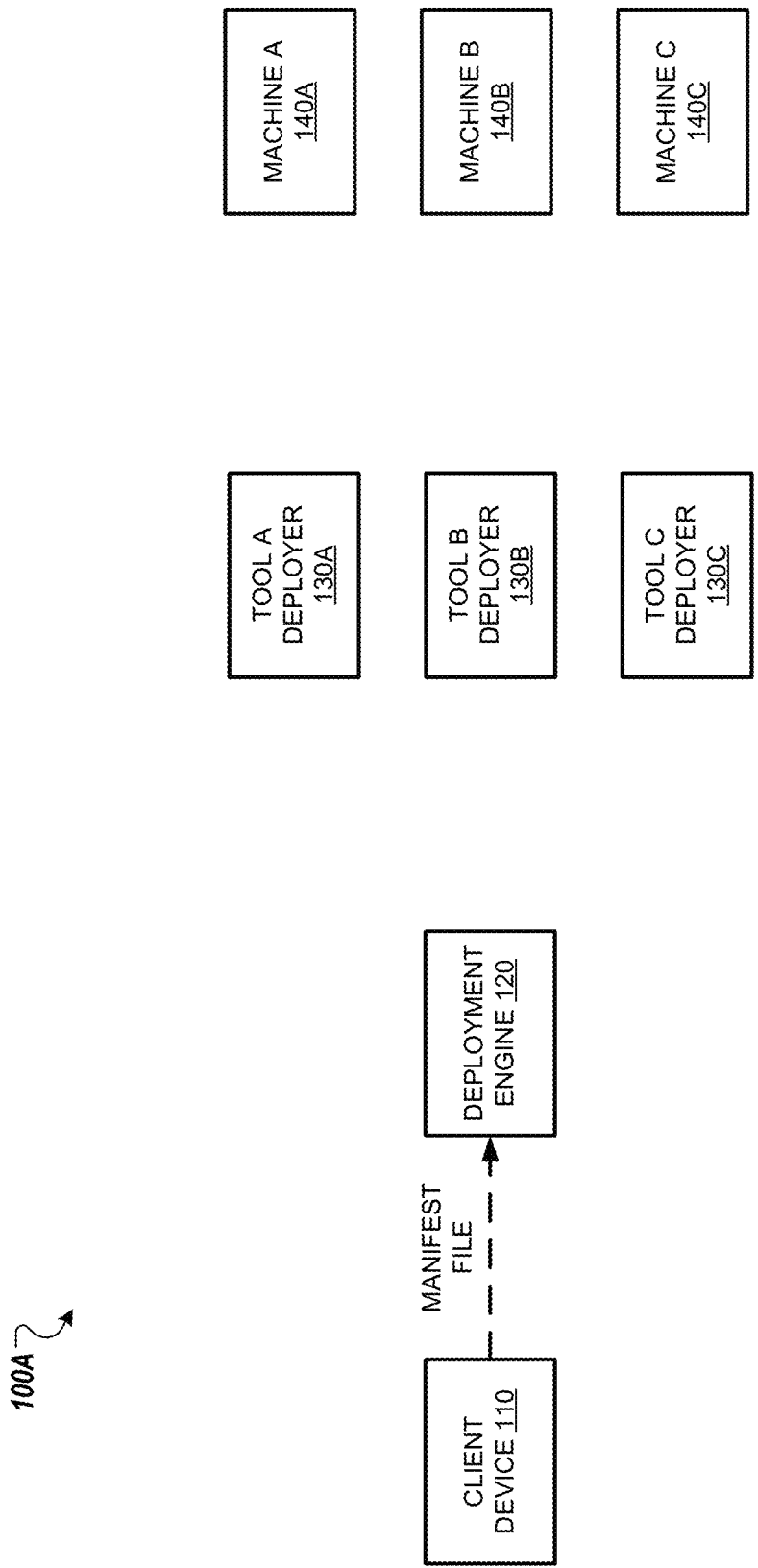
FIGS. 1A-1C illustrate example block diagrams of systems for provisioning an analytics platform using a manifest-enabled deployment engine.
Figure 1B:
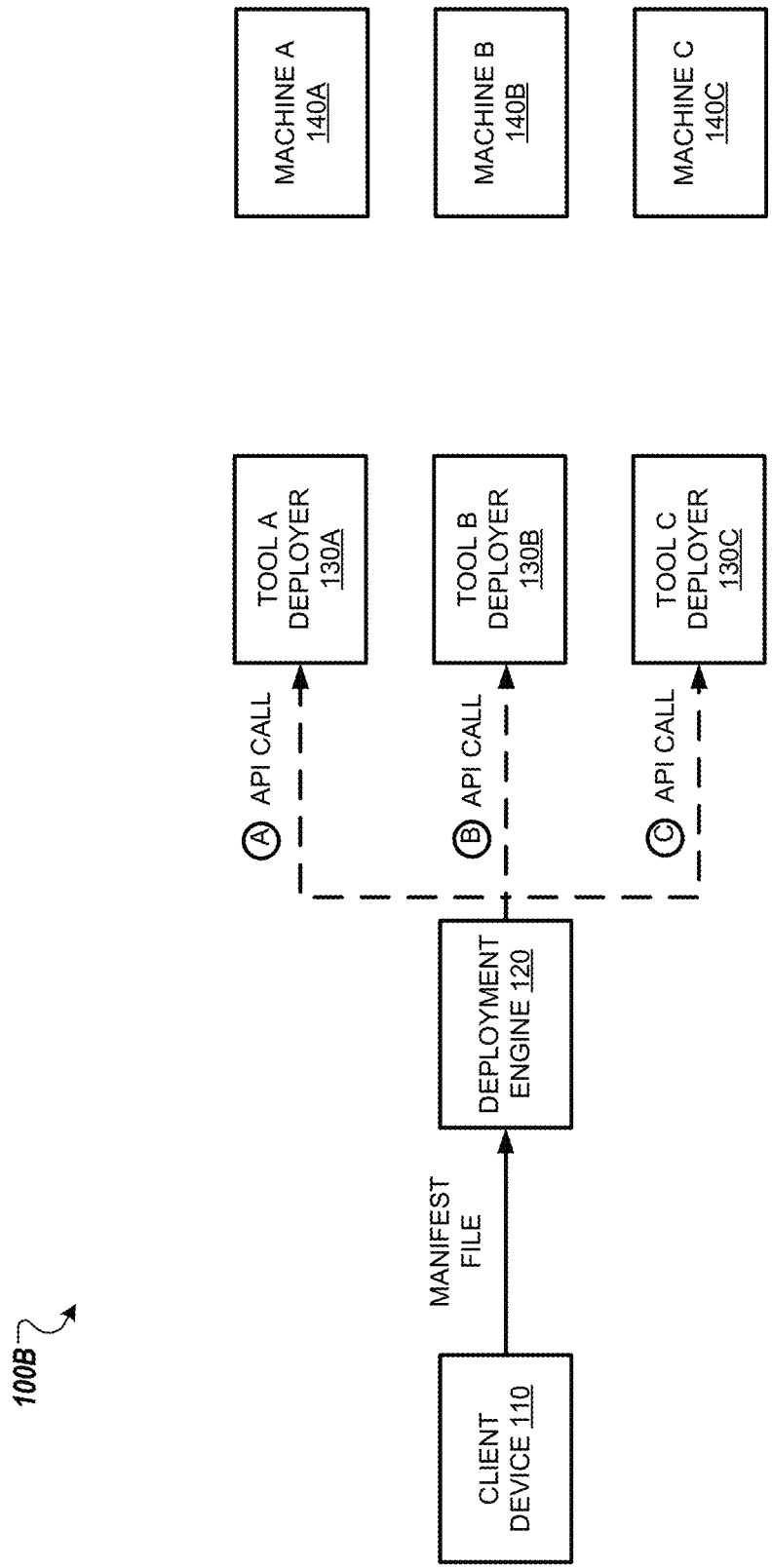
Figure 1C:
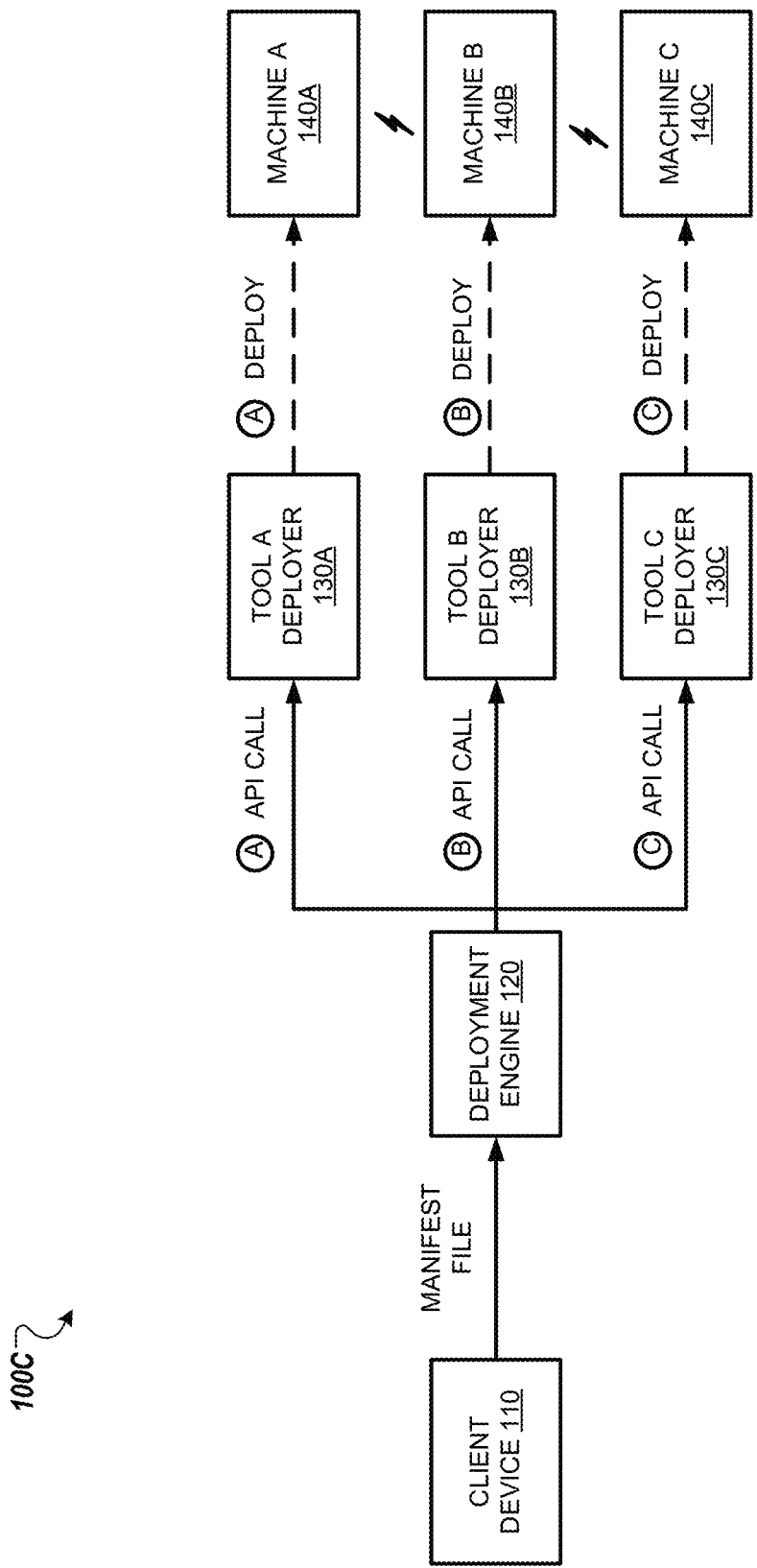

FIGS. 1A-1C illustrate example block diagrams of systems 100A, 100B, 1000 (hereinafter referred to together as 100A-C) for provisioning an analytics platform using a manifest-enabled deployment engine. The systems 100A-C of FIGS. 1A-1C include client devices 110, deployment engines 120, tool deployers 130A-C, and machines 140A-140C.

The client device 110 may be a computing device that may be used by an administrator to initiate provisioning an analytics platform. For example, the client device 110 may be a desktop computer that is used by a person to initiate provisioning of a particular platform. The client device 110 may initiate provisioning an analytics platform by providing a manifest file to the deployment engine 120. For example, the client device 110 may generate a manifest file and then call an API for the deployment engine 120, where the manifest file is provided as input for the API call.

A manifest file may be a set of data that indicates specifications for a platform. For example, the manifest file may be a JavaScript Object Notation (JSON) that includes text that describes, in a human readable format, a unique client identifier, a unique project identifier, and a bill of materials for a platform. A bill of materials may specify more technical specifications including types of machines, storage, networks, and other infrastructure that should host types of software tools and may further specify how the software tools interrelate to and interconnect with one another. For example, a bill of materials may specify that Tool A should be hosted on Machine B of type B, that Tool B should be hosted on Machine C of type C, and that Tool A should provide output to Tool B.

The manifest file for a platform to be provisioned may be generated in response to a user specifying services that a platform should provide and an environment in which the platform should operate. For example, the user may specify on the client device 110 that the user would like the platform to provide a data store and data visualization using a particular type of database system in a particular environment with particular computing devices.

The deployment engine 120 may receive a manifest file and parse the manifest file to determine which software tools need to be deployed, which machines the software tools should be deployed on, the order that the software tools should be deployed, and additional configurations of the tools to interoperate and interconnect with one another. For example, the deployment engine 120 may determine that a manifest file describes a platform that uses Tool A, B, and C and, in response, determine that Tool A should be first deployed, then Tool B deployed, then Tool A configured to obtain data from Tool B, then Tool C deployed, and then Tool C configured to obtain data from Tool A and Tool B.

The tool deployers 130A-C may be scripts used to deploy tools. For example, tool A deployer 130A may be a script that accepts an indication of a particular machine as an input and, when run, deploys tool A on the particular machine which was indicated in the input. In another example, tool B deployer 1308 may be a script that accepts an indication of a particular machine as an input and, when run, deploys tool B on the particular machine which was indicated in the input.

The machines 140A-C may be particular computing devices or systems on which the tools may be deployed. For example, Machine A may be a particular computing system in Frankfurt and Machine B may be a particular computing system in Dublin. In another example, Machine A may be a c4.large Amazon EC2 instance in the US East (Ohio) region, and Machine B may be an d2.large Amazon EC2 instance in the US West (Northern California) region.

FIG. 1A illustrates a block diagram of system 100A where the client device 110 provides a manifest file to the deployment engine 120 as part of an API call to the deployment engine 120.

FIG. 1B illustrates a block diagram of system 100A where the deployment engine 120 receives a manifest file and provides multiple calls to various tool deployers 130A-C. The deployment engine 120 may then call on the tool deployers in the order that the corresponding tools they deploy should be deployed.

As shown in FIG. 1B, the deployment engine 120 may determine from the manifest file that Tool. A should first be deployed, then Tool B deployed, and then Tool C. In response to determining tools to be deployed, the deployment engine 120 may then identify deployers for the tools. For example, in response to identifying Tool A should be deployed, the deployment engine 120 may identify Tool A deployer 130A that can be used to deploy Tool A. As another example, in response to identifying Tool B should be deployed after Tool A is deployed, the deployment engine 120 may identify Tool B deployer 130B that can be used to deploy Tool B.

FIG. 1C illustrates a block diagram of system 100A where the tool deployers 130A-C may respectively deploy tools 130A-C on corresponding machines 140A-C. For example, tool A deployer 130A may deploy tool A on machine A 140A, tool. B deployer 130B may deploy tool B on machine B 140B, and tool C deployer 130C may deploy tool C on machine C 140C.

While FIGS. 1A-C only show three tools on three machines, a platform deployed by the deployment engine 120 may include different arrangements of tools and machines. For example, the manifest file may specify the tools be deployed on different machines, additional tools be deployed on the machines, or additional tools be deployed on additional machines.

In some implementations, the deployment engine 120 may additionally perform quality assurance. For example, the deployment engine 120 may verify that each of the tools are independently functioning correctly and then verify that the tools are functioning together correctly.

Figure 2:
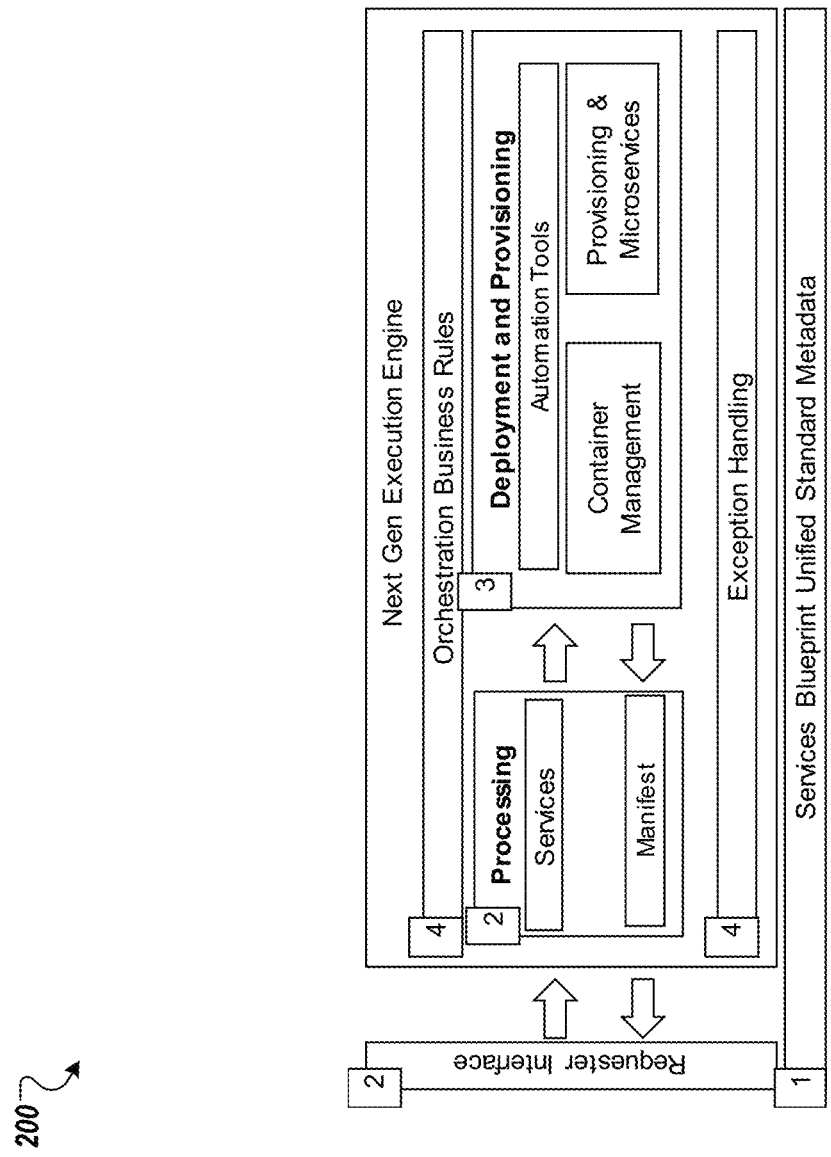
FIG. 2 illustrates another example block diagram of a system that includes a manifest-deployment engine.

FIG. 2 illustrates another example block diagram of a system 200 that includes a manifest-deployment engine. The system 200 may include services blueprint unified standard metadata, request interface and processing, deployment and provisioning, and orchestration business rules and quality.

The services blueprint unified standard metadata may ensure deployments are defect-free with well-documented and standardized across vendors and confirm consistency and repeatability with environment built with service blueprints for improved quality.

The request interface and processing may include service-oriented architecture, extensible API library to support standards based secure deployment, and service architecture with 3rd party integration to remove human interaction during deployment. The request interface and processing may remove barriers to automation by introducing an environment manifest to allow independent tools to deploy and integrate within and environment echo-system, security in a distributed environment, and visual process composition and monitoring.

The deployment and provisioning may include one or more of cloud support for various cloud service providers, automated provisioning and deployment with QA and handover, certified secure node and container base image, standardized software package-based component library for rapid deployment, and command and control integration for monitoring and maintenance.

Orchestration business rules and quality may include blueprint-aware orchestration with business rules, automated QA and error handling, enterprise standards support for network, infrastructure tagging, operating system, and management, fault tolerance with repeatable processes, reliability with flexible client driven deployment pattern, and scalability with cloud agnostic deployment pattern across multiple clients.

Figure 3:
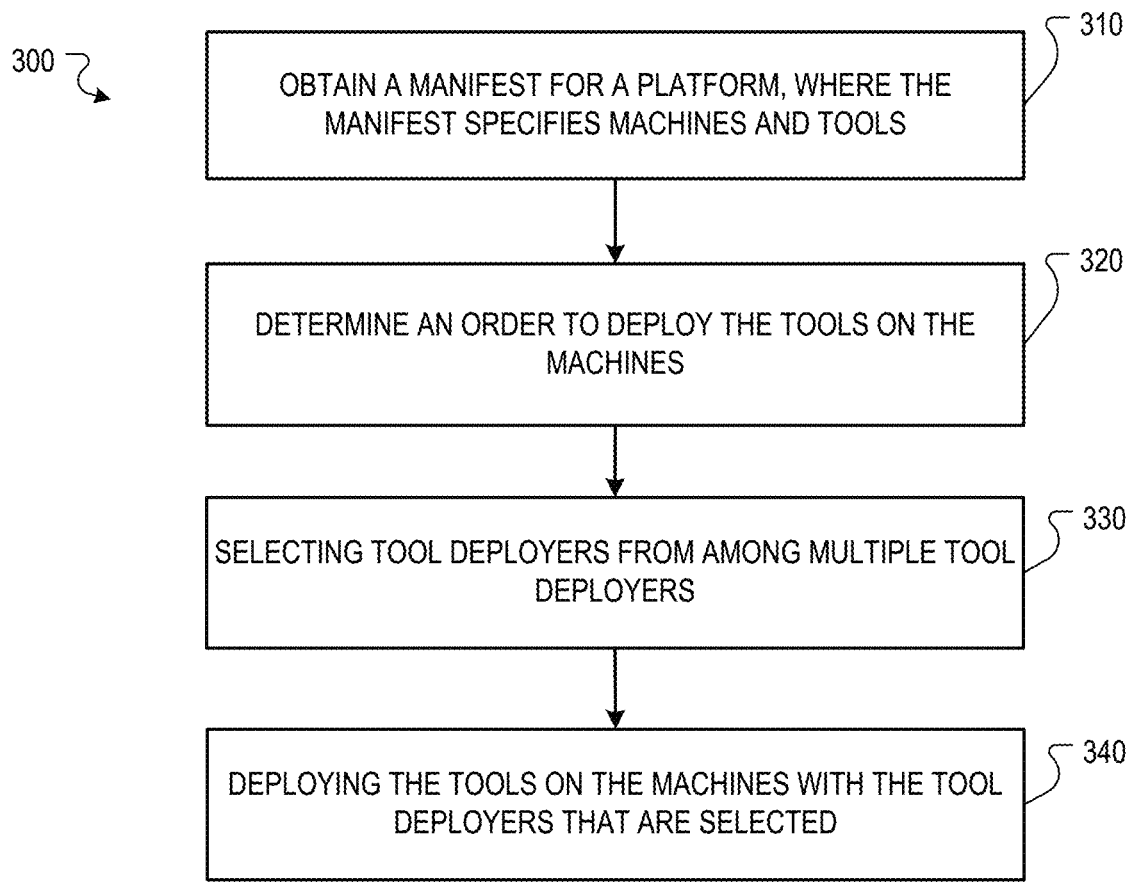
FIG. 3 illustrates a flowchart of an example process for provisioning an analytics platform using a manifest-enabled deployment engine.

FIG. 3 illustrates a flowchart of example process 300 for provisioning a platform using a manifest-enabled deployment engine as part of the request interface and processing. The flowchart 300 shows an example where manifest-enabled deployment engine may integrate with various other systems through the various system interfaces of the request interface described above to deploy an analytics platform with a manifest. The operations of the process 300 may be performed by system 100 or other systems.

The process 300 includes obtaining a manifest for a platform where the manifest specifies machines and tools (310). For example, the deployment engine 120 may obtain a manifest file from the client device 110 where the manifest file specifies that Tool A is to be deployed on. Machine A, Tool B is to be deployed on Machine B, and Tool C is to be deployed on Machine C. In another example, the deployment engine 120 may obtain a manifest file from the client device 110 where the manifest file specifies that Tool A is to be deployed on Machine A, Tool B is to be deployed on Machine B, Tool C is to be deployed on Machine B, and Tool D is to be deployed on Machine C. In some implementations, obtaining a manifest may include obtaining a manifest through an API call. For example, the deployment engine 120 may receive an API call from the client device 110 where the manifest file is an input to the API call.

The process 300 includes determining an order to deploy the tools on the machines (320). For example, the deployment engine 120 may determine to deploy Tool A on Machine A first, Tool B on Machine B second, and Tool C on Machine C third. In another example, the deployment engine 120 may determine to deploy Tool C on Machine C first, Tool B on Machine B second, and Tool A on Machine A third.

In some implementations, determining an order to deploy the tools on the machines based on the manifest includes determining that a first tool obtains data from a second tool and, in response to determining that the first tool obtains data from the second tool, determining to deploy the second tool before deploying the first tool. For example, the deployment engine 120 may determine that Tool B uses data from Tool A as input and, in response, determine to deploy Tool A before deploying Tool B. In another example, the deployment engine 120 may determine that Tool A uses data from Tool B as input and, in response, determine to deploy Tool B before deploying Tool A.

In some implementations, determining an order to deploy the tools on the machines based on the manifest includes determining that a first tool is to obtain data from a second tool and a third tool is to obtain data from the first tool and, in response to determining that the first tool is to obtain data from the second tool and the third tool is to obtain data from the first tool, determining to deploy the first tool and the second tool, configure the first tool to obtain data from the second tool, deploy the third tool, and configure the third tool to obtain data from the first tool. For example, the deployment engine 120 may determine that Tool B uses data from Tool A as input and Tool C uses data from Tool B as input and in response, determines to deploy Tool A, then deploy Tool B second, then configure Tool B to obtain data from Tool A as input, then deploy Tool C, and then configure Tool C to accept data from Tool B as input.

In some implementations, determining an order to deploy the tools on the machines based on the manifest includes referencing rules that specify an order that particular tools may be deployed on a particular machine. For example, a rule may specify that Tool B can only be deployed on a machine that does not already have Tool A deployed on the same machine so the deployment engine 120 may determine as Tools A and B are both to be deployed on Machine A, Tool B must be deployed first on Machine A and then Tool A may be deployed on Machine A.

The process 300 includes selecting tool deployers from among multiple tool deployers (330). For example, the deployment engine 120 may select Tool Deployers A, B, C from among Tool Deployers A-Z. In another example, the deployment engine 120 may select Tool Deployers B, C, and F from among Tool Deployers A-M.

In some implementations, selecting, based on the manifest file, tool deployers that are configured to deploy particular tools on machines from among multiple tool deployers includes identifying a particular tool specified by the manifest and selecting a particular deployer for deploying the particular tool that is identified. For example, the deployment engine 120 may identify that Tool B is specified by the manifest and, in response, select Tool Deployer B that deploys Tool B. In another example, the deployment engine 120 may identify that Tool C is specified by the manifest and, in response, select Tool Deployer C that deploys only Tool C and no other tools of Tools A-Z.

In some implementations, selecting, based on the manifest file, tool deployers that are configured to deploy particular tools on machines from among multiple tool deployers includes selecting a particular tool deployer based on both (i) a particular tool specified by the manifest and (ii) a particular machine on which the particular tool is specified to be deployed. For example, the deployment engine 120 may select Tool Deployer BB that is configured to deploy Tool. B on Machine B based on determining that that the manifest specifies Tool B is to be deployed on Machine B. In another example, the deployment engine 120 may select Tool Deployer BC that is configured to deploy Tool B on Machine C based on determining that that the manifest specifies Tool B is to be deployed on Machine C.

In some implementations, selecting, based on the manifest file, tool deployers that are configured to deploy particular tools on machines from among multiple tool deployers includes selecting a particular tool deployer based on both (i) a particular tool specified by the manifest and (ii) where in the order the particular tool is to be deployed. For example, the deployment engine 120 may select Tool Deployer A1 that is configured to deploy Tool A before any other tool is deployed based on determining that that the manifest specifies Tool A is the first tool to be deployed. In another example, the deployment engine 120 may select Tool Deployer A2 that is configured to deploy Tool A as a second tool deployed based on determining that that the manifest specifies Tool A is the second tool to be deployed. In some implementations, the tool deployers may be selected based on mappings. For example, human specified mappings between scripts and combinations of particular tool and particular machines may be referenced by the deployment engine 120 and then used to identify the script that corresponds to a particular tool and particular machine specified by a manifest file.

The process 300 includes deploying the tools on the machines with the tool deployers that are selected and in accordance with the order that is determined (340). For example, the deployment engine 120 may provide an API call to Tool. Deployer A that in response deploys Tool A, then provide an API call to Tool Deployer B that in response deploys Tool B, then provide an API call to Tool Deployer C that in response deploys Tool C.

In some implementations, deploying the tools on the machines with the tool deployers that are selected and in accordance with the order that is determined includes deploying a first tool on an instance of a virtual server provided by a first cloud provider and deploying a second tool on an instance of a virtual server provided by a second cloud provider. For example, the deployment engine 120 may trigger Tool A to be deployed on a virtual server provided by Cloud Provider A and trigger Tool B to be deployed on a virtual server provided by Cloud Provider B.

In some implementations, a particular tool deployer for a particular tool of the tools comprises a script that is configured to receive an indication of a particular machine as an input and, in response to receipt of the indication of the particular machine, deploy the particular tool on the particular machine. For example, Tool Deployer A may be a script that in response to receiving an indication of Machine B, deploys Tool A on Machine B and, in response to receiving an indication of Machine C, deploys Tool A on Machine C.

In some implementations, the process 300 includes configuring the tools to interoperate in accordance with the manifest. For example, the deployment engine 120 may configure the deployed tools to receive data from one another. In some implementations, the process 300 includes validating the platform after the tools are deployed. For example, the deployment engine 120 may perform multiple checks to ensure the platform is functioning correctly after deploying and configuring the tools.

Figure 4:
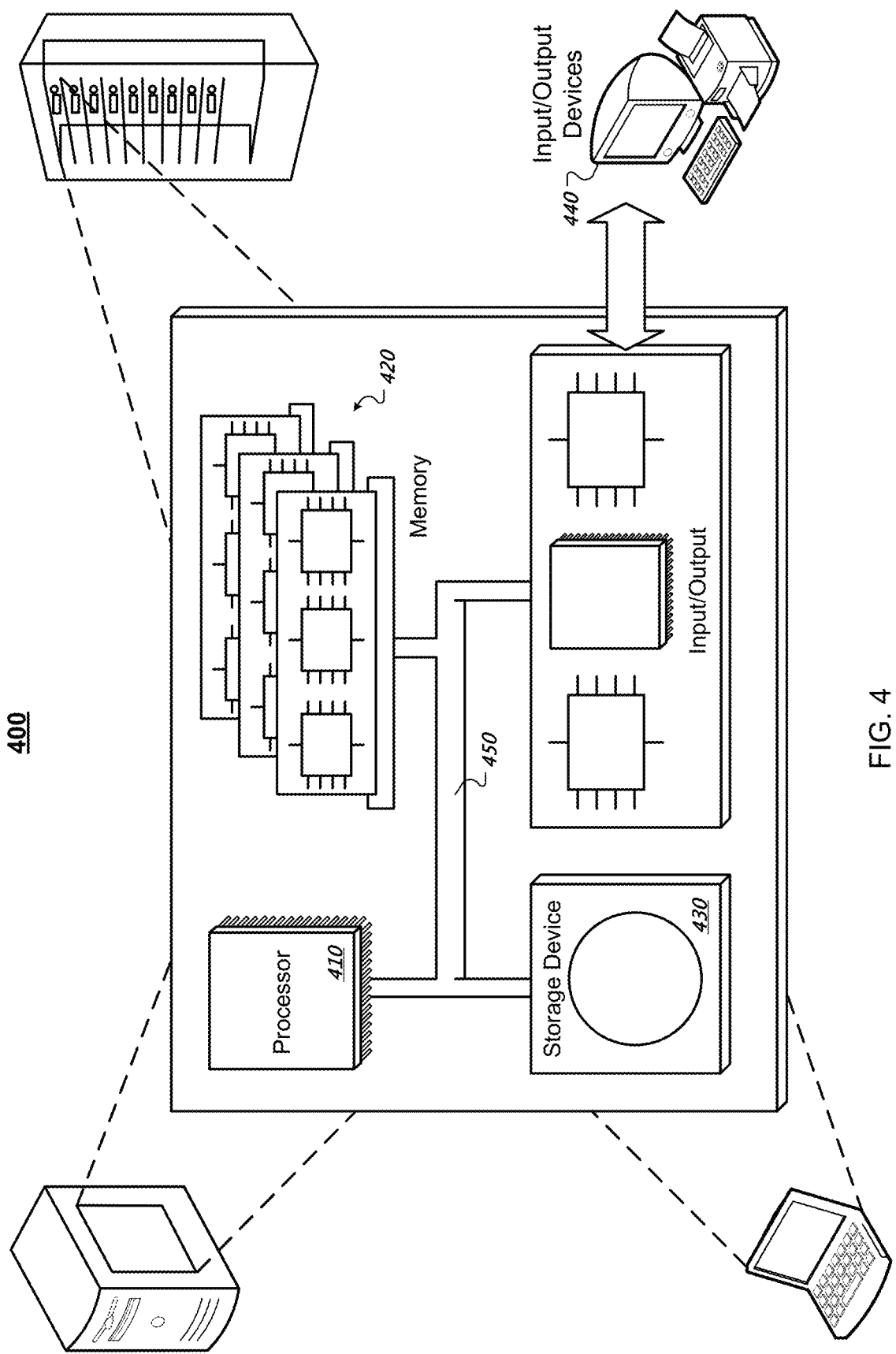
FIG. 4 illustrates a schematic diagram of an exemplary generic computer system.

FIG. 4 illustrates a schematic diagram of an exemplary generic computer system 400. The system 400 includes a processor 410, a memory 420, a storage device 530, and an input/output device 440. Each of the components 410, 420, 530, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, a solid state drive, an optical disk device, a tape device, universal serial bus stick, or some other storage device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method, comprising:
    obtaining a manifest for a platform to be deployed where the manifest specifies machines and tools to deploy on the machines;
    determining an order to deploy the tools on the machines based on the tools to deploy specified by the manifest;
    selecting, based on the manifest, tool deployers that are configured to deploy particular tools on machines from among multiple tool deployers,
    wherein selecting the tool deployers includes selecting, based on when a particular tool of the tools is to be deployed in the order that was determined, a particular tool deployer for deploying the particular tool from among multiple tool deployers for deploying the particular tool; and
    deploying the tools on the machines with the tool deployers that are selected and in accordance with the order that is determined.

2. The method of claim 1, wherein determining an order to deploy the tools on the machines based on the tools to deploy specified by the manifest comprises:
    determining that a first tool obtains data from a second tool; and
    in response to determining that the first tool obtains data from the second tool, determining to deploy the second tool before deploying the first tool.

3. The method of claim 1, wherein determining an order to deploy the tools on the machines based on the tools to deploy specified by the manifest comprises:
    determining that a first tool is to obtain data from a second tool and a third tool is to obtain data from the first tool; and
    in response to determining that the first tool is to obtain data from the second tool and the third tool is to obtain data from the first tool, determining to:
    deploy the first tool and the second tool,
    configure the first tool to obtain data from the second tool,
    deploy the third tool, and
    configure the third tool to obtain data from the first tool.

4. The method of claim 1, wherein selecting, based on the manifest, tool deployers that are configured to deploy particular tools on machines from among multiple tool deployers comprises:
    identifying the particular tool that is specified by the manifest; and
    selecting the particular deployer for deploying the particular tool that is identified.

5. The method of claim 1, wherein selecting, based on the manifest, tool deployers that are configured to deploy particular tools on machines from among multiple tool deployers comprises:
    selecting the particular tool deployer based on both (i) the particular tool being specified by the manifest and (ii) a particular machine on which the particular tool is specified to be deployed.

6. The method of claim 1, wherein deploying the tools on the machines with the tool deployers that are selected and in accordance with the order that is determined comprises:
    deploying a first tool on an instance of a virtual server provided by a first cloud provider; and
    deploying a second tool on an instance of a virtual server provided by a second cloud provider.

7. The method of claim 1, wherein a particular tool deployer for a particular tool of the tools comprises a script that is configured to:
    receive an indication of a particular machine as an input and,
    in response to receipt of the indication of the particular machine, deploy the particular tool on the particular machine.

8. The method of claim 1, comprising:
    configuring the tools to interoperate in accordance with the manifest.

9. The method of claim 1, comprising:
    validating the platform after the tools are deployed.

10. A system comprising:
    one or more computers and one or more storage devices storing instructions that are operable, when executed by the one or more computers, to cause the one or more computers to perform operations comprising:
    obtaining a manifest for a platform to be deployed where the manifest specifies machines and tools to deploy on the machines;
    determining an order to deploy the tools on the machines based on the tools to deploy specified by the manifest;
    selecting, based on the manifest, tool deployers that are configured to deploy particular tools on machines from among multiple tool deployers,
    wherein selecting the tool deployers includes selecting, based on when a particular tool of the tools is to be deployed in the order that was determined, a particular tool deployer for deploying the particular tool from among multiple tool deployers for deploying the particular tool; and deploying the tools on the machines with the tool deployers that are selected and in accordance with the order that is determined.

11. The system of claim 10, wherein determining an order to deploy the tools on the machines based on the tools to deploy specified by the manifest comprises:

determining that a first tool obtains data from a second tool; and in response to determining that the first tool obtains data from the second tool, determining to deploy the second tool before deploying the first tool.

12. The system of claim 10, wherein determining an order to deploy the tools on the machines based on the machines specified by the manifest and the tools to deploy specified by the manifest comprises:

determining that a first tool is to obtain data from a second tool and a third tool is to obtain data from the first tool; and in response to determining that the first tool is to obtain data from the second tool and the third tool is to obtain data from the first tool, determining to:
deploy the first tool and the second tool,
configure the first tool to obtain data from the second tool,
deploy the third tool, and
configure the third tool to obtain data from the first tool.

13. The system of claim 10, wherein selecting, based on the manifest file, tool deployers that are configured to deploy particular tools on machines from among multiple tool deployers comprises:

identifying the particular tool that is specified by the manifest; and selecting the particular deployer for deploying the particular tool that is identified.

14. The system of claim 10, wherein selecting, based on the manifest, tool deployers that are configured to deploy particular tools on machines from among multiple tool deployers comprises:

selecting the particular tool deployer based on both (i) the particular tool being specified by the manifest and (ii) a particular machine on which the particular tool is specified to be deployed.

15. The system of claim 10, wherein deploying the tools on the machines with the tool deployers that are selected and in accordance with the order that is determined comprises:

deploying a first tool on an instance of a virtual server provided by a first cloud provider; and deploying a second tool on an instance of a virtual server provided by a second cloud provider.

16. The system of claim 10, wherein a particular tool deployer for a particular tool of the tools comprises a script that is configured to:

receive an indication of a particular machine as an input and, in response to receipt of the indication of the particular machine, deploy the particular tool on the particular machine.

17. The system of claim 10, comprising:

configuring the tools to interoperate in accordance with the manifest.

18. A non-transitory computer-readable medium storing instructions executable by one or more computers which, upon such execution, cause the one or more computers to perform operations comprising:

obtaining a manifest for a platform to be deployed where the manifest specifies machines and tools to deploy on the machines;

determining an order to deploy the tools on the machines based on the tools to deploy specified by the manifest;

selecting, based on the manifest, tool deployers that are configured to deploy particular tools on machines from among multiple tool deployers, wherein selecting the tool deployers includes selecting, based on when a particular tool of the tools is to be deployed in the order that was determined, a particular tool deployer for deploying the particular tool from among multiple tool deployers for deploying the particular tool; and deploying the tools on the machines with the tool deployers that are selected and in accordance with the order that is determined.

* * * * *